P. C. VAN BROCKLIN.
Cultivator.
No. 37,988.          Patented Mar. 24, 1863.
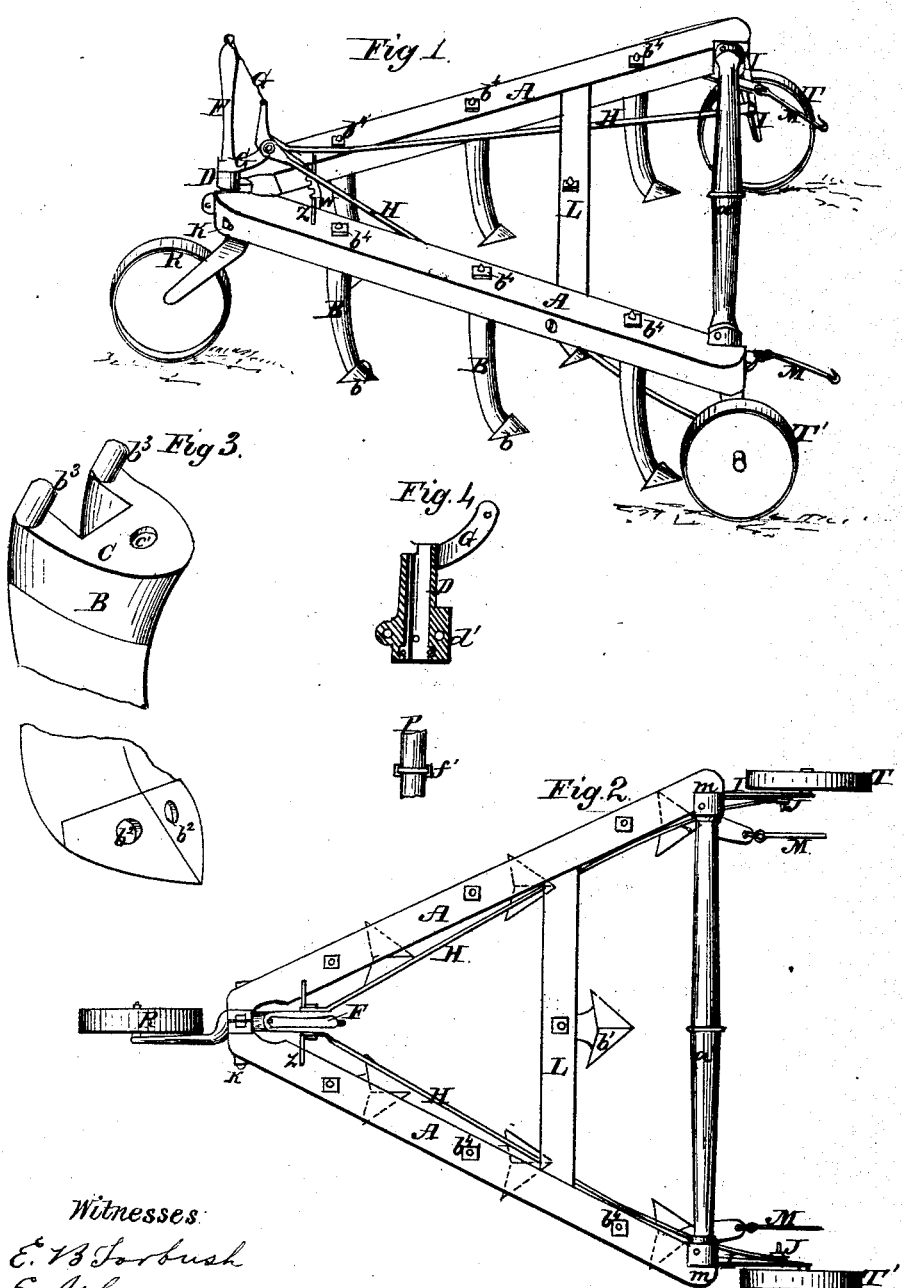
Witnesses:
E. B. Forbush
E. R. Lorne
Inventor.
P. C. Van Brocklin

UNITED STATES PATENT OFFICE.

P. C. VAN BROCKLIN, OF BUFFALO, NEW YORK.

IMPROVEMENT IN CULTIVATORS.

Specification forming part of Letters Patent No. 37,988, dated March 24, 1863.

*To all whom it may concern:*

Be it known that I, PHILIP C. VAN BROCKLIN, of the city of Buffalo and State of New York, have invented certain new and useful Improvements in Field-Cultivators; and I do hereby declare that the following is a full, clear, and exact description thereof, reference being had to the accompanying drawings, making a part of this specification, in which—

Figure I is a perspective view, the carrying-wheels being lowered into position, so as to elevate the plows from the ground. Fig. II is a plan view, the carrying-wheels being elevated, so as to let the plows into the soil. Fig. III is a perspective of the shank to which the plow-blade is fastened, in order to show more clearly the manner of fastening the shank to the frame. Fig. IV is a vertical section of the socket or journal box which supports the caster-wheel.

The nature of my invention relates to the arrangement of the plows upon a triangular frame, so that the base of the triangular frame shall be the forward end of the machine; second, in the arrangement of a carrying-wheel at each corner of the frame, so that the wheels may be moved in a manner to raise the plows from the ground for traveling from field to field, and so that the wheels may be made to govern the depth the plow shall enter the soil; third, in the combination of a caster-wheel with the apex of the triangular frame, so that the cultivator may follow a direct line and be easily turned round; fourth, in the peculiar manner of fastening the plow-shanks to the frame.

Letters of like name and kind refer to like parts in each of the figures.

A represents the main frame, to which the plows are attached. It is made of wood in a triangular form, the several parts being stoutly put together.

B and $b'$ represent the plow as a whole. The shank part B (shown in Fig. III) is made of cast-iron. The plowshare $b'$, Figs. I and II, is held to the shank by means of screws or bolts passing through the share and through the holes $b^2$. The top part of the shank has two projecting pins, as seen at $b^3$. These pins enter the wood, and, in connection with the bolt $b^4$, serve to hold the shank firmly to the frame. In casting the shank the metal is caused to form a plate over a portion of the hollow part, as shown at C, so that a screw-bolt may pass through the bolt-hole $C'$ made in the plate and through the frame-timber, and thereby the bolt $b^4$, in connection with the steady-pins, will hold the plow firmly to the frame.

D represents a socket or journal-box, which supports the caster-wheel E. This box is cast in two parts, and the two parts are held together by bolts passing through the holes $d'$. A chamber, $e$, is made for the reception of the collar $f'$, which is made on the lever-shaft F, so that the shaft will be held in place. Arms are projected from this socket, as shown at G, to which the rods H are connected. These rods also connect with the axle-arms I on the two forward wheels, T and T', as shown at J, so that the driver by grasping and lifting upon the lever shaft F may raise or depress the three wheels at the same time, and thereby lift the plows entirely out of the soil and carry the cultivator upon the wheels; or they may be fixed at such points as may be desired by means of the ratchet-bar W in order to regulate or determine the depth the plows shall enter the soil. This socket is placed between the timbers at the apex of the frame, and is held thereto by means of the bolt K in such a manner that the socket will swing or turn freely on the bolt when the driver lifts upon the lever-shaft F.

W represents a ratchet-bar, which is placed between the arms G and held by the bolt X, which bolt passes through the flattened end of the rods H and through the arms G and through the ratchet-bar. The ratchet-bar is free to turn upon the bolt, and is of such shape that when the operator pulls upon the upper end by means of the cord $y$ the teeth will be disengaged from their hold upon the rod Z and the operator can then move the wheels as he pleases. The wheels may then be set at any height desired to govern the depth the plows shall enter the soil. The ratchet-bar will hold them firmly in place as set. The rod Z gives additional strength to the forward part of the frame.

L represents a cross-timber, which is framed into the side timbers, to which one plow is attached. The front timber, $a'$, or that which represents the base of the triangle, has journal-bearings in the side timbers, as shown at $m$.

The axle-arms I are rigidly connected to this timber, so that when the driver lifts upon the lever-shaft F this timber will, through the arrangement of parts already described, be turned upon its journals in either direction to elevate or lower the wheels.

M represents draft-hooks, to which the horses are attached.

This cultivator has an admirable adaptation to the inequalities of the ground by reason of making the base of the triangular frame the front end of the machine. It is also less liable to clog, and in turning round the wheels may be dropped down, so that one of the wheels will form a pivot, and the caster-wheel at the apex of the frame will allow the machine to come around easily in the arc of a circle.

What I claim as my invention, and desire to secure by Letters Patent, is—

In cultivators having a triangular frame with a wheel at each corner supporting a caster-wheel at the apex of the frame, in a socket or journal box which is hung upon a bolt or pin in such a manner that it may turn or swing freely upon said bolt, in combination with a swivel lever-shaft which connects with the wheel and extends upwardly for a handle, and operates as a swivel upon which the wheel turns freely, and which is connected with the forward wheels by means of rods taking hold of the arms I below the frame, so that all of the wheels may be raised or lowered simultaneously by the driver, substantially as and for the purposes described.

P. C. VAN BROCKLIN.

Witnesses:
E. B. FORBUSH,
E. OSBORNE.